H. P. G. NORSTRAND.
MIXER CAP FOR GAS RANGE BURNERS.
APPLICATION FILED DEC. 15, 1911.
1,084,472.
Patented Jan. 13, 1914.
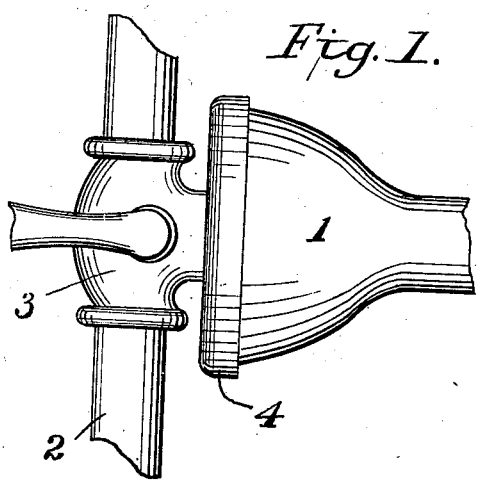
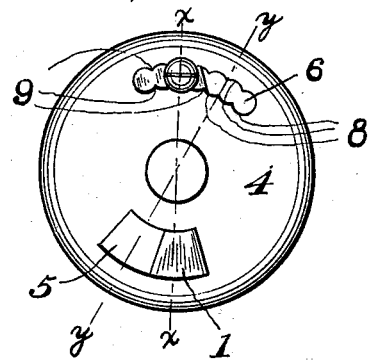
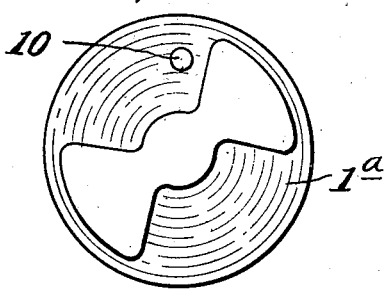
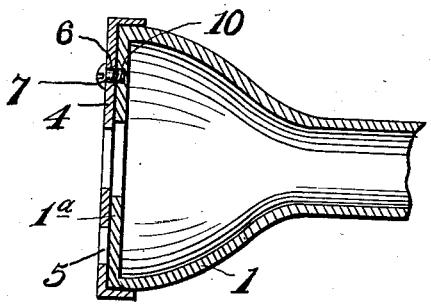
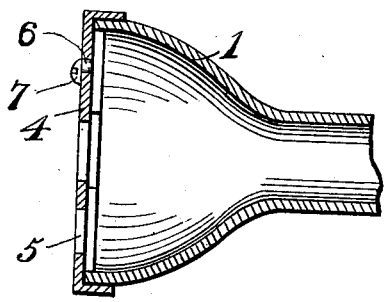
Witnesses
J. Allan Hobson jr.
M. E. Shook
Hans P. G. Norstrand,
Inventor,
By Edson Bro's,
Attorneys.

UNITED STATES PATENT OFFICE.

HANS P. G. NORSTRAND, OF ALBANY, NEW YORK, ASSIGNOR TO RATHBONE, SARD & COMPANY, OF ALBANY, NEW YORK, A CORPORATION OF NEW YORK.

MIXER-CAP FOR GAS-RANGE BURNERS.

1,084,472.  Specification of Letters Patent.  Patented Jan. 13, 1914.

Application filed December 15, 1911. Serial No. 665,944.

*To all whom it may concern:*

Be it known that I, HANS P. G. NORSTRAND, a citizen of the United States, residing at Albany, in the county of Albany and State of New York, have invented certain new and useful Improvements in Mixer-Caps for Gas-Range Burners; and I do hereby declare the following to be a full, clear, and exact description of the invention, such as will enable others skilled in the art to which it appertains to make and use the same.

My invention relates to mixer caps for gas range burners.

One type of mixer cap already known is adjustable by means of a screw fitted in a fixed portion of the mixing chamber and projecting through an arcuate slot formed in the cap concentric to its axis of turning. In this prior construction, the retaining of the cap in its predetermined properly adjusted position, which allows just the right amount of air to enter the mixing chamber, depends entirely upon the frictional contact of the head of the screw upon the outer margins of the arcuate slot. If the screw becomes loose, by accident, as very often occurs, the cap is free to shift, thereby changing the size of the air admitting openings and destroying the predetermined proper mixture of air and gas for the particular burner.

The object of my present invention is to prevent this shifting of the mixer cap by the accidental loosening of the screw. To this end, I provide an arcuate slot with corrugated edges adapted to engage the shank of the screw and prevent the shifting of the cap, even though said screw does become accidentally loosened. At the same time, said corrugations permit of close adjustments. Furthermore, the corrugated slot is utilized as one of the air admitting openings in the cap whereby the construction of said cap is simplified and the cost of its manufacture reduced to a minimum.

The invention also consists in the features of construction and combinations of parts hereinafter described, illustrated in the accompanying drawing, and specified in the appended claim.

In the accompanying drawing: Figure 1 is a plan view of a mixer equipped with my improved cap. Fig. 2 is an end view of the mixer looking directly at the cap, the supply pipe being removed. Fig. 3 is a similar view of the mixer with the cap removed. Fig. 4 is a central longitudinal section of the mixer taken on the line $x$—$x$ of Fig. 2, and Fig. 5 is a similar section on the line $y$—$y$ of Fig. 2.

Referring more particularly to the drawing, 1 designates the mixer having a front flange 1$^a$, 2 the supply pipe having the valve 3 therein, and 4 my improved mixer cap. In its simplest form, said cap is made with only two arcuate slots, one 5 solely designed for admitting air and the other 6 serving as an air inlet opening and also as the adjustment retaining device in connection with the set screw 7. The shank of said screw fits between corresponding corrugations 8 in the opposite edges of the slot, while the projecting points 9, separating said corrugations, engage said shank and prevent the cap from slipping in either direction as long as said screw remains in its socket 10 in the mixer. The head of the screw is adapted to clamp the margins of the slot 6 but this is not essential in my construction because even if the screw becomes accidentally loosened, the corrugations, engaging its shank, will retain said cap at the proper point of adjustment.

I claim:

A combination with a mixer having a front flange and an air admitting opening, of an adjustable air admitting cap therefor having a combined air admitting and adjusting slot provided with a corrugated edge, and a screw carried by the mixer and projecting through said slot, the shank of said screw fitting one of the corrugations in said slot, the air being admitted to the mixer through the slot in the cap and the opening in the front flange.

In testimony whereof, I affix my signature, in presence of two witnesses.

HANS P. G. NORSTRAND.

Witnesses:
WM. E. PALMER,
J. G. EVERETT.

Copies of this patent may be obtained for five cents each, by addressing the "Commissioner of Patents, Washington, D. C."